(12) United States Patent
Nass et al.

(10) Patent No.: US 6,384,718 B1
(45) Date of Patent: May 7, 2002

(54) METHOD AND AN ARRANGEMENT FOR DETECTING AN OBSTACLE

(75) Inventors: Thilo Nass, Rutesheim; Frank Seidel, Stuttgart; Martin Noll, Muggensturm; Frank Hoenes, Ditzingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/456,116

(22) Filed: Dec. 7, 1999

(30) Foreign Application Priority Data

Dec. 10, 1998 (DE) .......................................... 198 56 974

(51) Int. Cl.$^7$ ................................................. B60Q 1/00
(52) U.S. Cl. ........................ 340/435; 340/436; 340/903
(58) Field of Search .............................. 340/433, 435, 340/436, 437, 438, 471, 901, 903, 904, 933, 938, 943, 932.2; 701/47, 300, 301; 342/27, 28, 70, 71

(56) References Cited

U.S. PATENT DOCUMENTS

| | | | | |
|---|---|---|---|---|
| 4,920,520 A | * | 4/1990 | Gobel et al. | 367/99 |
| 5,210,521 A | * | 5/1993 | Hojell et al. | 340/436 |
| 6,163,253 A | * | 12/2000 | Yaron et al. | 340/436 |
| 6,173,233 B1 | * | 1/2001 | Janutka et al. | 340/903 |
| 6,215,438 B1 | * | 4/2001 | Oswald et al. | 342/70 |

FOREIGN PATENT DOCUMENTS

| | | |
|---|---|---|
| DE | 34 20 004 A1 | 12/1985 |
| DE | 40 23 538 A1 | 1/1992 |
| DE | 197 11 467 A1 | 10/1998 |

* cited by examiner

*Primary Examiner*—Van T Trieu
(74) *Attorney, Agent, or Firm*—Michael J. Striker

(57) ABSTRACT

An arrangement for detecting the presence of an obstacle in the vicinity of an object includes art least one transmitter that emits a pulsed signal from a predetermined location of the object, at least two receivers capable of receiving echoes of such a pulsed signal as reflected from the obstacle each at a different location of the object, and an evaluating device that measures respective time intervals elapsing between the emission of the pulsed signal and the receipt of the respective echo by the associated receiver. The evaluating device furthermore establishes the presence of the obstacle in a first environmental region of the object when either the time interval to a first one of the two locations is smaller than a first threshold or the time interval to a second one of the two locations is smaller than a second threshold, as well as the presence of the obstacle in a second environmental region of the object when the time interval to the first location is smaller than a third threshold exceeding the first threshold and the time interval to the second location is simultaneously greater than a fourth threshold exceeding the second threshold.

10 Claims, 3 Drawing Sheets

METHOD AND AN ARRANGEMENT FOR DETECTING AN OBSTACLE

BACKGROUND OF THE INVENTION

1. Field of the Invention

The present invention relates to detection of proximity of certain objects to others in general, and more particularly to methods and arrangements for detecting the proximity of stationary obstacles to moving motor vehicles.

2. Description of the Related Art

There are already known various constructions of arrangements for detecting the proximity of one object to another, among them such that detect the distance between a moving object, especially a motor vehicle, and a stationary object or obstacle, and issue a warning when the two get too close together. Arrangements of the latter type and methods performed by them are typically employed in parking aid systems, such as one developed by the assignee of the present invention and known under the designation Parkpilot. The system of this kind includes a plurality of sensors that are located on the vehicle in question and that serve both to transmit signal pulses and receive echoes of such transmitted signal pulses that have been reflected by any obstacle that may be present within the effective ranges of such sensors.

Each such echo can be received either by the sensor at which the original signal pulse had originated, or by any neighboring sensors. The above-mentioned system detects the presence of an obstacle on the basis of the respective echo and generates various warning signals, among them a stop signal that advises the driver of the vehicle to bring the vehicle to an immediate halt, or when the time interval elapsing between the issuance of the signal pulse and the arrival of the echo of such pulse at any neighboring sensor is below a second threshold. The first threshold defines a part-circular region around the sensor as considered in cross section, the detection of presence of any object within which will lead to the generation of the stop signal. The second threshold defines a part-elliptical region as considered in cross section with focal points located at the respective signal transmitter and signal receiver in question, and the detection of presence of any object in this region will also trigger the generation of the stop signal. The magnitudes of the first and second thresholds are chosen in such a manner that the overlap of the part-circular and/or part-elliptical regions will form a strip or band having as constant a width as possible or feasible as measured from a baseline on which the sensors are located.

The substantially uniform width of the strip is important in order to accomplish uniform reliability of the warning during the approach of the obstacle over the entire length of the baseline, and to prevent the possibility that small objects or obstacle could get unnoticed into the vicinity of or even into contact with the part of the vehicle over which the sensors are distributed. On the other hand, for cost reasons, it is desirable to keep the number of the sensors as low as possible; yet, the greater the distance of the sensors from each other relative to the width of the strip, the more pronouncedly the width fluctuates over the course of the baseline.

This problem is especially aggravated when, for instance, sensors with a limited aperture angle are being used, and/or when the distance between the individual sensors cannot be made constant because of external boundary conditions.

OBJECTS OF THE INVENTION

Accordingly, it is a general object of the present invention to avoid the disadvantages of the prior art.

More particularly, it is an object of the present invention to provide a method of detecting the presence of an object, such as an obstacle, in the proximity of another of another object, such as motor vehicle bumper, which method would not possess the drawbacks of the known methods of this type.

Still another object of the present invention is to devise a method of the type here under consideration which would make it possible to maintain the width of a region within the presence of an obstacle will be detected substantially uniform even if the spacing between the sensors is not.

It is yet another object of the present invention to design an arrangement for performing the above method the above in such a manner as to be alerted to the presence of smaller obstacles no later than that of larger obstacles.

A concomitant object of the present invention is so to construct the arrangement of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a method of detecting the presence of an obstacle in the vicinity of an object. This method includes emitting a pulsed signal from a predetermined location of the object, receiving echoes of such a pulsed signal as reflected from the obstacle at at least two locations of the object, measuring respective time intervals elapsing between the emitting and receiving steps, and establishing the presence of the obstacle in a first environmental region of the object when at least one of the time interval to a first one of the two locations is smaller than a first threshold and the time interval to a second one of the two locations is smaller than a second threshold. The method of the present invention further involves the steps of selecting a third and a fourth threshold to exceed by predetermined amounts the first and second threshold, respectively, and establishing the presence of the obstacle in a second environmental region of the object when the time interval to the first location is smaller than the third threshold and the time interval to the second location is simultaneously greater than the fourth threshold. Advantageously, there may further be employed the step of establishing the presence of the obstacle in another second environmental region of the object when the time interval to the second location is smaller than the third threshold and the time interval to the first location is simultaneously greater than the fourth threshold.

The present invention is also directed to an arrangement for detecting the presence of an obstacle in the vicinity of an object, this arrangement comprising means for emitting a pulsed signal from a predetermined location of the object, means for receiving echoes of such a pulsed signal as reflected from the obstacle at least two locations of the object, and means for evaluating the echoes, including means for measuring respective time intervals elapsing between the emission of the pulsed signal by the emitting means and the receipt of the respective echoes by the receiving means, and means for establishing the presence of the obstacle in a first environmental region of the object when at least one of the time interval to a first one of the two locations is smaller than a first threshold and the time interval to a second one of the two locations is smaller than a second threshold, and the presence of the obstacle in a second environmental region of the object when the time interval to the first location is smaller than a third threshold exceeding the first threshold and the time interval to the second location is simultaneously greater than a fourth threshold exceeding the second threshold.

A particular advantage of the method and arrangement of the present invention as described so far is that they render it possible selectively to widen the strip from the boundary of the object within which the presence of an object is detected at a location that previously was particularly vulnerable to undetected passage therethough especially of relatively small obstacles, without increasing the width of the strip at other locations at which the width of the strip is sufficient for providing early enough warning of the presence of obstructions large and small, which would be the result if the magnitudes of the first and second thresholds were to be increased. The above method and arrangement is particularly useful when employed on or embodied in motor vehicles, especially their rear bumpers.

According to an advantageous facet of the present invention, the receiving means includes first and second receivers situated at the first and second locations of the object, respectively, and wherein the second environmental region is situated in its entirety at a side of the second receiver that is remote from the one receiver and at a predetermined distance from a plane normal to an imaginary line connecting the first and second receiver and passing through the second receiver. This avoids the otherwise exiting possibility of premature triggering of the alarm especially by large obstacles.

To achieve a simpler construction of the arrangement of the present invention, the receiving means includes substantially identical first and second receivers situated at the first and second locations of the object, respectively, and each simultaneously capable of serving as the emitting means. Such transmitters/receivers or transceivers then constitute simply sensors that are interchangeable with one another during the assembly of the arrangement and, moreover, can be produced less expensively than dedicated devices.

In order to be able to achieve reliability in the detection of obstacles in the vicinity of the object in question, it is proposed in accordance with the present invention that the receiving means include at least two pairs of receivers distributed along a border line of the object. When the object is a motor vehicle, then the border line is advantageously situated at the outer surface, and extends along the length, of a bumper of the motor vehicle.

It is especially advantageous for the receivers of the respective pair to be separated from each other by a distance smaller than that between any of the receivers of different ones of the pairs.

Last but not least, advantageous results especially as far as obstacle detection coverage is concerned is achieved when, in accordance with another aspect of the present invention, the third and fourth thresholds are chosen in such a manner that the second environmental regions of the two pairs of sensor overlap each other beyond the first environmental region.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 4:
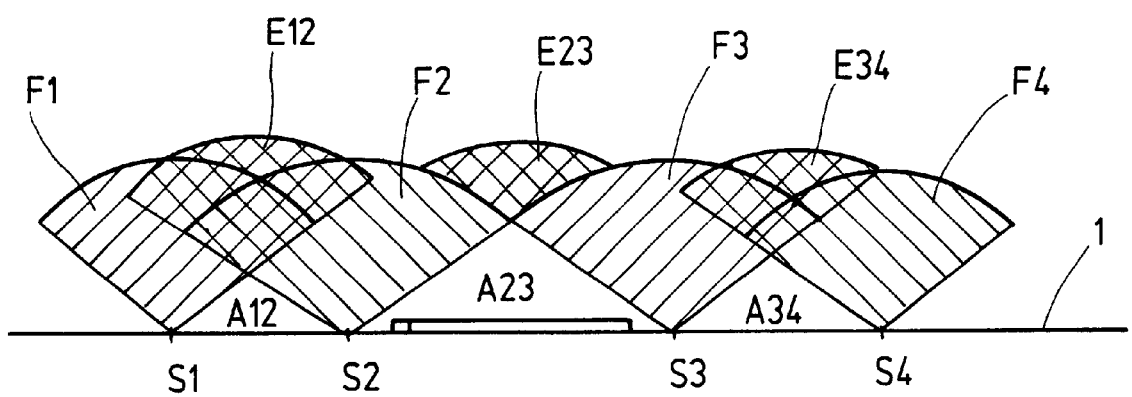
FIG. 4 is a view generally corresponding to that of FIG. 3 but showing a conventional sensing arrangement.

Referring now to the drawing in detail, and first to FIG. 4 thereof which discloses a conventional sensing arrangement underlying the present invention, it may be seen that the reference characters S1, S2, S3 and S4 have been used therein to identify four sensors (with just their locations being indicated) disposed at predetermined spacings from one another along a baseline 1 that is representative, for instance, of a vehicle bumper and will be henceforth referred to as such. The sensors S1, S2, S3 and S4 of this conventional arrangement are typically constructed as transceivers of a well known construction that needs not be addressed here and are used to detect the proximity of objects external to the vehicle to the bumper 1, typically the rear bumper, by emitting signals, especially ultrasound pulses, and receiving their echoes as they return from such external objects. As is well known, the electrical replicas of such returning echoes are then processed to determine if the external object poses an imminent danger of collision and the driver is informed accordingly if the result of the determination is positive.

FIG. 4 shows that the distribution of the sensors S1, S2, S3 and S4 along the bumper 1 is not necessarily uniform; as a matter of fact, the distance separating the sensors S2 and S3 exceeds that present within respective sensor pairs S1 and S2, on the one hand, and S3 and S4, on the other. This may be, for instance, necessitated by the presence of a license plate on the bumper 1 between the locations of the sensors S2 and S3. For the sake of simplification, the bumper (or baseline) 1 is shown as a straight line. Each of the sensors S1, S2, S3 and S4 is capable of emitting its signals into and of receiving signal echoes from its effective zone which may be and is shown to be conical (triangular in cross section) with the respective sensor S1, S2, S3 or S4 being situated at the tip of the cone. A warning signal is issued to the vehicle driver when one of the sensors S1, S2, S3 and S4 detects an incoming echo of its own signal before the expiration of a maximum time period that constitutes a first threshold value. This warning criterion determines the outer boundaries of respective regions F1, F2, F3 and F4 shown in FIG. 4 to commence at the respective sensors S1, S2, S3 and S4 and to have the configurations of circular sectors. Moreover, a warning signal is generated when one of the sensors S1, S2, S3 and S4 detects an incoming cross-echo of a signal originating at a respective neighboring sensor S2, S1/S3, S2/S4, or S3, respectively, before the expiration of a maximum time period that constitutes a second threshold value. On the basis of this second criterion, obstacles are detected that are located in or penetrate into respective regions E12, E23 and E34 that are respectively coincident with the regions of overlap of the effective zones of the neighboring sensors S1 and S2, S2 and S3, and S3 and S4, respectively and are delimited by respective curves constituting portions of respective ellipses the focal points of which are situated at the locations of the respective sensors S1 and S2, S2 and S3, and S3 and S4, respectively.

Because of the conical configurations of the effective zones, dead zones A12, A23 and A34 into which the sensors S1, S2, S3 and S4 do not transmit their signals and from which they are incapable of receiving any echoes are situated between the respective neighboring sensors S1, S2, S3 and S4 in the immediate vicinity of the bumper 1. Because of the relatively greater distance between the sensors S2 and S3, the extent of the dead zone A23 is larger than that of the neighboring dead zones A12 and A34 and the dimension of the region E23 in which the presence of an obstacle can be proven by the detection of a cross-echo returning therefrom, in the direction normal to the course of the bumper 1, is small by comparison. It could thus happen that a small obstacle would cross this region E23 within the time span separating two successive pulses of the sensors S2 and S3 and enter the dead zone A23 undetected, that is, without an echo returning from it and/or being sensed and hence without triggering the warning signal.

Figure 2:
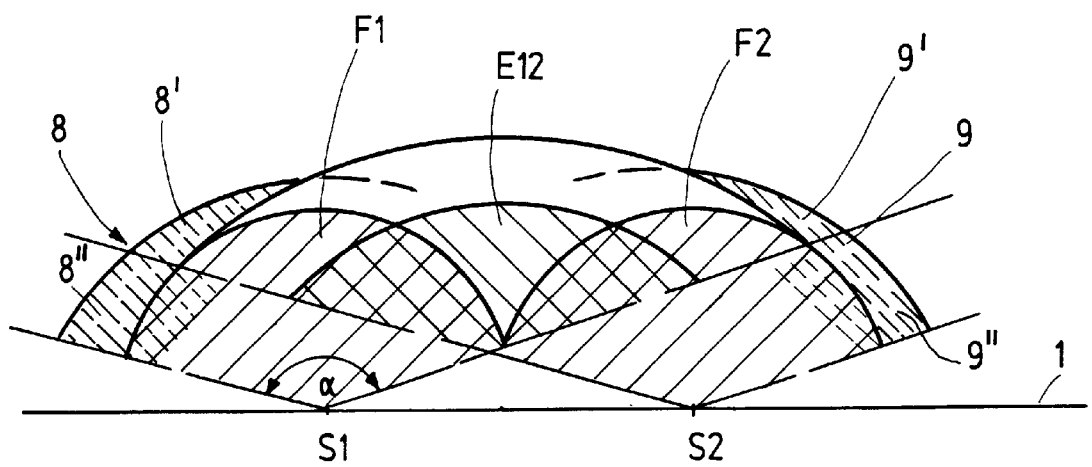
FIG. 2 is a view similar to that of FIG. 1 but with the sensors having limited areas of effectiveness.

The present invention avoids this drawback in a manner the principle of which is illustrated in FIG. 2 on the basis of just two sensors S1 and S2 of the aforementioned four. Here again, the sensors S1 and S2 are situated at a boundary line 1 of an object, such as that of a vehicle bumper as mentioned before, and may again be constructed as ultrasound transceivers. The sensors S1 and S2 emit respective ultrasound signals, and a evaluation unit that is not shown because it is of a conventional construction, measures the time intervals elapsing between the issuance of a signal and the arrival of its echo to either one of the sensors S1 and S2. The two sensors S1 and S2 may be operated alternately as issuers of the ultrasound signals. The evaluation unit compares the respective time interval elapsing between the issuance of the respective signal and the arrival of its so-called direct echo, that is the echo returned to the very same sensor S1 and S2 that had emitted the original signal, with a first threshold, and issues a warning of the presence in or approach to the vicinity of the object 1 of an external object or obstacle when the time interval of return of such a direct echo is smaller than a first threshold value. Consequently, each of the sensors S1 and S2 perceives by means of its direct echo any obstacles present in or penetrating into respective semicircular regions F1 and F2 at the center of which it is located.

The evaluation unit further compares the time interval of a cross-echo, that is that elapsing between the transmission of the respective ultrasound pulse by the sensor S1 and the arrival of its echo reflected from an obstacle at the sensor S2, or vice versa, with a second threshold value and warns of the approach of an obstacle when the time interval of return of such a cross-echo is smaller than the second threshold value. This warning criterion defines the region E12 having the shape of a half-ellipse at the foci of which the sensors S1 and S2 are located. The second threshold value is selected in such a manner in this example that the length of one-half the shorter axis of the ellipse substantially corresponds to the radius of the of each of the semi-circular regions F1 and F2, so that, due to the overlap between the semi-circular regions F1 and F2 and the semi-elliptical region E12, there is obtained a first environmental region 3 (that hatched by solid lines at different inclinations in FIG. 1 to show the overlap) having the shape of a strip with substantially the same width as measured from the baseline or object 1.

According to the present invention, it is further provided that the evaluation device additionally issues a warning signal when the direct echo arrival interval of, for instance, the sensor S1 is smaller than a third threshold that is greater than the first threshold, and simultaneously the cross-echo arrival interval to, in this instance, the sensor S2 is greater than a fourth threshold exceeding the second threshold. Obstacles satisfying this additional warning criterion would be located in or penetrating into a sickle-shaped second environmental region 8 that is situated at the side of the sensor S1 that is remote from the sensor S2 and that is indicated by dashed hatching lines. The overall region in which the sensors S1 and S2 detect an obstacle is thus extended in the longitudinal direction of the baseline 1 by the presence of the second environmental region 8; yet, there is no change whatsoever in the delimitation of the warning region intermediate the two sensors S1 and S2.

Similarly, and in a corresponding manner, when the echoes arriving at the first sensor S1 and having travel time intervals that are above the fourth threshold for the cross-echoes stemming from signals emanating from the sensor S2 and below the third threshold for the direct echoes to signals originally emitted by the sensor S1 are taken into consideration, there is obtained another longitudinal extension of the warning region in the opposite longitudinal direction of the baseline 1 by another sickle-shaped second environmental region 9.

Figure 1:
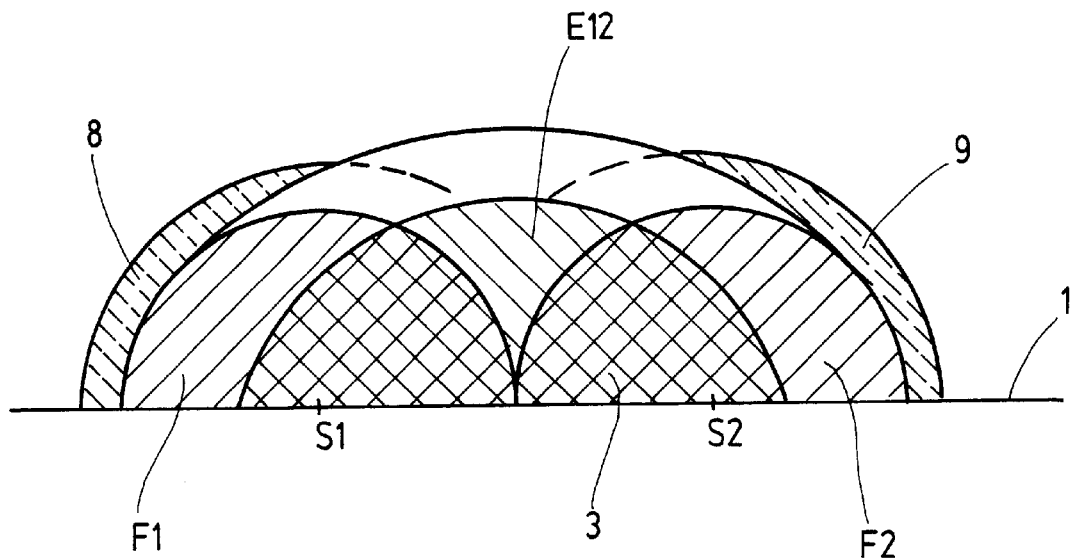
FIG. 1 is a diagrammatic view showing the effect of use of a sensing arrangement of the present invention employing two sensors mounted on an object.

FIG. 2 of the drawing shows a somewhat modified implementation of the present invention that differs from the one discussed just above in conjunction with FIG. 1 basically in that the sensors S1 and S2 are capable of emitting ultrasound pulses into and receiving echoes of such pulses exclusively from respective spatial zones that are within respective aperture windows of such sensors S1 and S2 and which exhibit an aperture angle α that is significantly smaller than 180°, such as about 120°, at the locations of the respective sensors S1 and S2. The aforementioned regions F1 and F2 in which the sensors S1 and are effective, are once more indicated by hatching, the solid lines constituting such hatching rising from left to right. The region E12, from which a cross-echo with a travel time between issuance and receipt is below the second threshold is indicated, to the extent that it is located within the aforementioned spatial zones, by hatching running from right below to left above. Of the sickle-shaped regions 8 and 9 that are present here as well when the present invention is employed, only tip portions 8' and 9' that are remote from the baseline 1 are located within the areas of reach or effectiveness of both sensors S1 and S2 into which they are both capable of emitting, and from which they are both capable of receiving echoes of, respective signals. This, however, does not present any difficulties within the framework of the present invention. This is so because the warning criterion for the regions 8 and 9, that is the criterion that triggers the issuance of a warning signal, consists of two parts: on the one hand, the arrival of a direct echo prior to the occurrence of the third threshold, and on the other hand the non-arrival of a cross-echo prior to the occurrence of the fourth threshold. Inasmuch as no cross-echo can ever be received from anywhere but the region of overlap of the aforementioned spatial areas, this second part of the above criterion is always satisfied within the remaining portions 8" and 9" of the second environmental regions 8 and 9, so that the first part of this criterion is the sole determinant of the issuance of the warning signal for these portions 8" and 9". This situation is visually indicated in the drawing by extending the dashed hatching lines that fill the portions 8" and 9" of the sickle-shaped regions 8 and 9 in which both parts of the above criterion are satisfied across the lines separating the regions 8 and 9 from the respective adjacent regions F1 and F2 outside the area of overlap of the aforementioned spatial zones in which the sensors S1 and S2 are effective partially into such adjacent regions F1 and F2.

Figure 3:
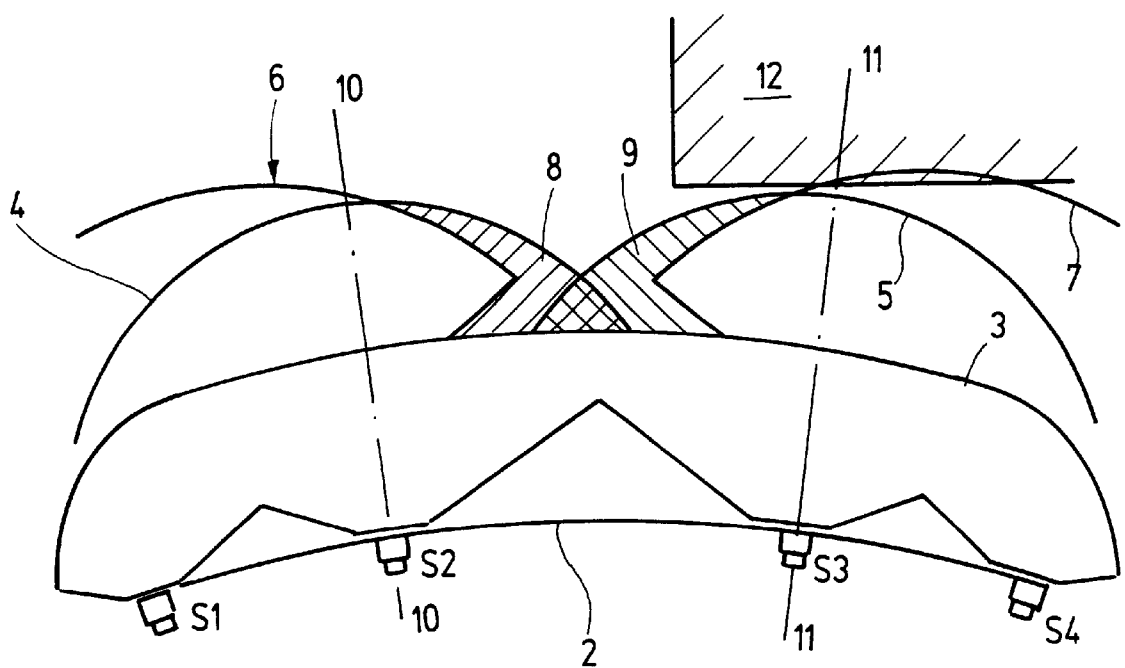
FIG. 3 is a view akin to that of FIG. 2 but showing a modified sensing arrangement including two additional sensors.

FIG. 3 of the drawing depicts, in a rather simplified, diagrammatic manner, a situation in which the two sensors S1 and S2 and two additional sensors S3 and S4 constructed and operating in accordance with the present invention in the same way as described above in connection with FIG. 2 of the drawing, are arranged at mutual spacings along the bumper of a motor vehicle which extends along an arcuate course and hence is identified by the reference numeral 2 to distinguish it from the straight baseline or representation of the bumper 1 discussed above. The sensors S1 to S4 are arranged, both physically and functionally, in respective pairs S1 and S2, and S3 and S4, respectively. Here again, as in FIG. 4, the distance between the sensors S1 and S2, on the one hand, and S3 and S4, on the other hand, of the respective pairs is smaller than that separating those sensors S2 and S3 of the two different pairs that are closer to each other. Once more, the reference numeral 3 identifies the aforementioned first environmental region of the vehicle or of the sensors S1, S2, S3 and S4 in which potential obstacles can be picked up by based solely on the arrival of direct echoes or cross-echoes before the occurrence of the first or second threshold, respectively. The constituent parts of this first environmental region 3 have not been shown, however, in order not to unduly encumber the drawing, because they have been fully shown and described elsewhere in this disclosure. Furthermore, in FIG. 3, respective part-circular arcs 4 and 5 indicate the boundaries of respective additional regions around the sensors S2 and S3, respectively, from which direct echoes return back to such sensors S2 and S3 before the occurrence of the aforementioned third temporal threshold. Respective elliptical arcs 6 and 7, the focal points of which reside at the locations of the sensors S1 and S2, and S3 and S4, respectively, indicate the limits of the spatial region defined by the fourth threshold. The hatched regions 8 and 9 are the aforementioned second environmental regions of the first sensor pair S1 and S2 and of the second sensor pair S3 and S4, respectively. Each of these second environmental regions 8 and 9 consists of a sickle-shaped portion that is more remote from the bumper 2 and a remainder portion that is closer to the bumper 2 and has, generally speaking, a triangular configuration. From the sickle-shaped portions, direct echoes arrive back at the respective originating sensors S2 ad S3 before the expiration of the third threshold, while cross-echoes are received by the respective other sensors S1 and S4 of the respective pairs a short time after the expiration of the fourth threshold. No cross-echoes at all, though, are received from the substantially triangular remainder portions of the second environmental regions 8 and 9, inasmuch as the sensors S1 and S4, respectively, are incapable of sensing signals into or receiving echoes from such triangular remainder portions. Yet, the second part of the above-mentioned warning criterion is satisfied not only in the sickle-shaped portions of the second environmental regions 8 and 9 but also in the generally triangular remainder portions (because of the total absence of the cross-echoes), and, consequently, so is the entire criterion. This means that, should a small obstacle penetrate into one or the other of the second regions 8 or 9, a warning will be reliably triggered. It will be realized that the second environmental regions 8 and 9, in effect, thicken the first environmental region 3 at a location at which it is most vulnerable to undetected passage of such a small object, as discussed above with respect to FIG. 4 of the drawing.

The third and fourth thresholds of the sensor pairs S1 and S2, and S3 and S4, respectively, are chosen in such a way that the environmental regions 8 and 9 terminate short of, that is at a predetermined distance from, respective planes 10 and 11 that extend substantially normal to respective imaginary lines connecting the sensors S1 and S2, and S3 and S4 of the respective pairs with each other, respectively, and passing through the sensors S2 and S3. The reason for this measure will become apparent when one considers the approach to a large obstacle 12, such as the corner or a building. In the situation shown in FIG. 3 of the drawing, the building corner 12 is clearly exterior to the second environmental region 9 situated closest to it, so that no warning is issued. A warning prior during the approach to the large obstacle 12 is namely desirable only when the latter penetrates into the first environmental region 3. Then, the building corner 12 intersects the elliptical arc 7. Consequently, the part of the building corner that is situated inside the elliptical arc 7 thus furnishes a cross-echo that arrives at the respective one of the sensors S3 and S4 before the expiration of the fourth threshold. As the approach of the building corner 12 continues, even the second environmental region 9 eventually begins to overlap with the corner 12. Yet, even in this case, a cross-echo from the building corner 12 would have already been received before the expiration of the fourth threshold, so that the arrangement of the present invention does not react to the penetration of the large obstacle 12 into the second environmental region 9 where it would have were the obstacle relatively small. In this manner, there is obtained a selective extension of the reach of the warning region beyond the original environmental region 3 for smaller objects or obstacles, for which the danger of "diving through" the warning region into the dead region between the sensors S2 and S3 would have been especially great, whereas the equipment embodying the present invention behaves exactly the same as in the conventional one vis-a-vis larger obstacles such as the building corner 12 for which the conventional approach to issuing the warning is more than adequate.

It will be understood that each of the elements described above, or two or more together, may also find a useful application in other types of constructions differing from the type described above.

While the present invention has been described and illustrated herein as embodied in a specific construction of a collision warning system for motor vehicles, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim that:

1. A method of detecting the presence of an obstacle in the vicinity of an object, comprising the steps of
   emitting a pulsed signal from a predetermined location of the object;
   receiving echoes of such a pulsed signal as reflected from the obstacle at at least two locations of the object;
   measuring respective time intervals elapsing between said emitting and receiving steps;
   establishing the presence of the obstacle in a first environmental region of the object when at least one of said time interval to a first one of said two locations is smaller than a first threshold and said time interval to a second one of said two locations is smaller than a second threshold;

selecting a third and a fourth threshold to exceed by predetermined amounts said first and second threshold, respectively; and establishing the presence of the obstacle in a second environmental region of the object when said time interval to said first location is smaller than said third threshold and said time interval to said second location is simultaneously greater than said fourth threshold.

2. The method as defined in claim 1, and further comprising the step of establishing the presence of the obstacle in another second environmental region of the object when said time interval to said second location is smaller than said third threshold and said time interval to said first location is simultaneously greater than said fourth threshold.

3. The method as defined in claim 1, wherein the object is a motor vehicle.

4. An arrangement for detecting the presence of an obstacle in the vicinity of an object, comprising means for emitting a pulsed signal from a predetermined location of the object;

means for receiving echoes of such a pulsed signal as reflected from the obstacle at at least two locations of the object; and means for evaluating said echoes, including means for measuring respective time intervals elapsing between the emission of said pulsed signal by said emitting means and the receipt of the respective echoes by said receiving means, and means for establishing the presence of the obstacle in a first environmental region of the object when at least one of said time interval to a first one of said two locations is smaller than a first threshold and said time interval to a second one of said two locations is smaller than a second threshold, and the presence of the obstacle in a second environmental region of the object when said time interval to said first location is smaller than a third threshold exceeding said first threshold and said time interval to said second location is simultaneously greater than a fourth threshold exceeding said second threshold.

5. The arrangement as defined in claim 4, wherein said receiving means includes first and second receivers situated at said first and second locations of the object, respectively; and wherein said second environmental region is situated in its entirety at a side of said second receiver that is remote from said one receiver and at a predetermined distance from a plane normal to an imaginary line connecting said first and second receiver and passing through said second receiver.

6. The arrangement as defined in claim 4, wherein said receiving means includes substantially identical first and second receivers situated at said first and second locations of the object, respectively, and each simultaneously capable of serving as said emitting means.

7. The arrangement as defined in claim 4, wherein said receiving means includes two pairs of receivers distributed along a border line of the object.

8. The arrangement as defined in claim 7, wherein said receivers of the respective pair are separated from each other by a distance smaller than that between any of said receivers of different ones of said pairs.

9. The arrangement as defined in claim 8, wherein said third and fourth thresholds are chosen in such a manner that said second environmental regions of said two pairs of sensor overlap each other beyond said first environmental region.

10. The method as defined in claim 4, wherein the object is a motor vehicle.

* * * * *